(12) United States Patent
Miyazaki et al.

(10) Patent No.: US 7,104,039 B2
(45) Date of Patent: Sep. 12, 2006

(54) METALLIC CORD AND PNEUMATIC TIRE EMPLOYING THE METALLIC CORD

(75) Inventors: Shinichi Miyazaki, Kobe (JP); Osamu Toda, Kobe (JP)

(73) Assignee: Sumitomo Rubber Industries Ltd., Kobe (JP)

( * ) Notice: Subject to any disclaimer, the term of this patent is extended or adjusted under 35 U.S.C. 154(b) by 0 days.

(21) Appl. No.: 10/751,417

(22) Filed: Jan. 6, 2004

(65) Prior Publication Data

US 2005/0060978 A1    Mar. 24, 2005

Related U.S. Application Data

(62) Division of application No. 09/694,812, filed on Oct. 24, 2000, now Pat. No. 6,703,126.

(30) Foreign Application Priority Data

| Oct. 25, 1999 | (JP) | ............................. 11-302462 |
| Nov. 2, 1999 | (JP) | ............................. 11-312142 |

(51) Int. Cl.
   *D02G 3/02*   (2006.01)

(52) U.S. Cl. ..................................................... 57/210

(58) Field of Classification Search .................. 57/210, 57/211, 227, 228, 232–234, 902, 230; 152/556, 152/557
See application file for complete search history.

(56) References Cited

U.S. PATENT DOCUMENTS

| 3,565,127 | A | * | 2/1971 | Doyle et al. ............. 139/426 R |
| 3,644,866 | A | * | 2/1972 | Deardurff ................... 338/214 |
| 3,805,508 | A | | 4/1974 | Maderna |
| 3,908,351 | A | | 9/1975 | Carroll |
| 4,073,330 | A | | 2/1978 | Allard |
| 4,216,645 | A | * | 8/1980 | Andersen ..................... 57/212 |
| 4,321,854 | A | * | 3/1982 | Foote et al. ..................... 87/6 |
| 5,323,596 | A | | 6/1994 | Nguyen |
| 5,605,036 | A | * | 2/1997 | Onuma et al. ................. 57/212 |
| 6,158,490 | A | | 12/2000 | Starinshak |
| 6,273,160 | B1 | | 8/2001 | Helfer et al. |
| 6,332,310 | B1 | | 12/2001 | Miyazaki et al. |
| 6,405,774 | B1 | | 6/2002 | Komatsu |
| 6,415,593 | B1 | | 7/2002 | Miyazaki et al. |
| 2001/0011569 | A1 | | 8/2001 | Miyazaki et al. |
| 2002/0095928 | A1 | | 7/2002 | Fidan et al. |

FOREIGN PATENT DOCUMENTS

| DE | 4120554 A | 12/1992 |
| DE | 41 25 887 A1 | 11/1993 |
| EP | 0 732 225 A2 | 9/1996 |
| EP | 0 732 225 A3 | 9/1996 |
| JP | 63-19404 U | 2/1988 |
| JP | 5-182531 A | 7/1994 |
| JP | 10-292275 A | 11/1998 |
| JP | 10-292276 A | 11/1998 |
| JP | 11-21776 A | 1/1999 |

* cited by examiner

*Primary Examiner*—Shaun R Hurley
(74) *Attorney, Agent, or Firm*—Birch, Stewart, Kolasch & Birch, LLP

(57) ABSTRACT

The present invention provides a metallic cord for reinforcing a tire moldable in a tire manufacturing step without complicating operations and keeping strength by reducing rusting and an excellent pneumatic tire employing the metallic cord.

The inventive metallic cord for reinforcing a tire is formed by shaping a bundle prepared by paralleling a plurality of metallic wires having substantially circular sections in an unstranded state with a binder of a polymer material having a melting point of 50° C. to 200° C. The polymer material is preferably low-density polyethylene or medium-density polyethylene. The diameters of the metallic wires are preferably 0.15 to 0.3 mm.

20 Claims, 3 Drawing Sheets

METALLIC CORD AND PNEUMATIC TIRE EMPLOYING THE METALLIC CORD

This application is a Divisional of application Ser. No. 09/694,812, filed on Oct. 24, 2000, now U.S. Pat. No. 6,703,126 the entire contents of which are hereby incorporated by reference and for which priority is claimed under 35 U.S.C. § 120; and this application claims priority of Application No. 11-302462 and 11-312142 filed in Japan on Oct. 25, 1999 and Nov. 2, 1999, respectively under 35 U.S.C. § 119.

BACKGROUND OF THE INVENTION

1. Field of the Invention

The present invention relates to a metallic cord for reinforcing a tire and a pneumatic tire employing the metallic cord for a belt layer and/or a carcass.

2. Description of the Prior Art

Important subjects for a pneumatic radial tire, particularly a radial tire for a passenger car are reduction of rolling resistance, improvement of durability, reduction of the manufacturing cost, and improvement in comfortableness of the vehicle.

The characteristics of a belt layer, particularly those of a cord embedded in the belt layer and the rigidity of the belt layer exert remarkable influence on improvement of the aforementioned performance.

For example, Japanese Utility Model Laying-Open No. 63-19404 (1988) proposes a technique of reducing the rolling resistance of a tire by employing not a cord but a steel wire material for a belt layer. In such a tire, however, the steel wire material is disadvantageously broken when a vehicle provided with such a tire repeats steep turns.

The rigidity of the belt layer dominates the deformation of the belt layer when a vehicle provided with the tire is in motion, and influences the basic performance and durability of the tire. In particular, the rigidity of the belt layer influences the rolling resistance, high-speed driving performance and cornering performance as well as belt end separation resulting from cracking between plies at an end portion of the belt layer caused by a load applied to the tire when the car is in motion. Therefore, prescribed rigidity of the belt layer must be ensured. The belt end separation is caused by growth of cracking of rubber resulting from stress concentrating on the end portion of the belt layer due to repetitive deformation of the belt layer when the car provided with the tire is in motion, particularly deformation of the belt layer upon cornering. Therefore, resistance against such belt end separation is important for attaining durability of the tire.

On the other hand, a pneumatic radial tire for a truck or a bus used under sever conditions due to a high load and high-speed driving must maintain at high levels the strength of not only a cord for a belt layer but also a carcass ply cord. In general, the carcass of such a radial tire for a truck or a bus must be improved in transverse rigidity in order to maintain steering stability when subjected to repetitive deformation following high-speed driving under a high load. Therefore, the carcass cord is formed by a steel cord, in order to satisfy requirement for strength and durability for sufficiently withstanding such distortion/deformation.

In general, a single-layer stranded structure of a multi-layer stranded structure of 7×4, 3+7 or 3+8+13 is employed for the carcass cord of this type of tire. When such a cord densely charged with steel wires is embedded in carcass rubber, however, the rubber insufficiently penetrates into the steel cord. Therefore, when a side wall portion is damaged by sharp stones and rocks during driving, for example, it follows that water penetrates the damaged portion, which in turn serves as a starting point for diffusing moisture into the space defined by the steel cord, causing the creation and spreading of rust. Consequently, the adhesion between the steel cord and the rubber deteriorates and the steel cord becomes broken which reduces the durability of the tire.

Further, the aforementioned steel cord, having a complicated structure, requires complicated manufacturing steps, which results in a high manufacturing cost for the metallic cord.

In order to solve these problems, there is proposed the so-called loose cord construction formed by stranding steel wires while defining a clearance therebetween to produce steel cords containing a clearance between the wires for improving the penetrability of rubber into the cord. However, such a steel cord requires a forming step as well as a stranding step for the steel wires resulting in a high manufacturing cost for the steel cord. Also, the steel wires come apart from each other in the step of molding the tire, damaging the uniformity and durability of the product tire.

In order to solve this problem, each of Japanese Patent Laying-Open Nos. 10-292275 (1998) and 10-292276 (1998), for example, employs an unstranded metallic cord. However, cord wire materials forming the unstranded metallic cord, not shaped as a cord disadvantageously separate from each other in the step of molding the tire, resulting in various problems.

Japanese Patent Laying-Open No. 11-27446 (1999) discloses an example of binding unstranded cords with a wrapping wire. However, the wrapping wire bundling and shaping a plurality of steel wires locally rubs the steel wires to reduce durability. Prevention of such rubbing is limited since shaping performance is reduced when the cords are loosely bundled.

SUMMARY OF THE INVENTION

An object of the present invention is to provide a metallic cord for reinforcing a tire which is moldable in a tire manufacturing step, without complicating the manufacturing operations and maintaining tire strength while reducing metallic cord rust. Advantageously, a pneumatic tire employing the metallic cord of the present invention for a belt layer and/or a carcass possesses excellent durability and rolling resistance.

The present invention provides a metallic cord for reinforcing a tire, formed by shaping a bundle prepared by paralleling a plurality of metallic wires having substantially circular sections, in an unstranded state, with a binder of a polymer material having a melting point of 50° C. to 200° C. The polymer material is preferably low-density polyethylene or medium-density polyethylene. The diameters of the said metallic wires are preferably 0.15 to 0.3 mm. The binder is formed by a cord, a tape-like material or a string-type material.

The present invention also provides a pneumatic tire having the framework of a carcass toroidally extending between a pair of bead portions with the crown portion of the carcass reinforced with a belt layer consisting of at least two plies, and at least one ply of the belt layer is formed by embedding a metallic cord obtained by shaping a bundle prepared by paralleling a plurality of metallic wires having substantially circular sections in an unstranded state with a binder of polymer material having a melting point of 50° C. to 200° C. in rubber.

The present invention also provides a pneumatic tire having a framework of a carcass toroidally extending between a pair of bead portions with a crown portion of the carcass reinforced with a belt layer consisting of at least two plies, and at least one ply of the belt layer is formed by embedding a metallic cord obtained by shaping a bundle prepared by paralleling a plurality of metallic wires having substantially circular sections in an unstranded state with a binder of a polymer material having a melting point of 50° C. to 200° C. in rubber.

The present invention further provides a pneumatic tire having a framework of a carcass toroidally extending between a pair of bead portions with a crown portion of the carcass reinforced with a belt layer consisting of a plurality of plies, in which at least one ply of the belt layer is formed by embedding in the rubber a metallic cord obtained by shaping a bundle prepared by paralleling a plurality of metallic wires having substantially circular sections in an unstranded state with a binder of polymer material having a melting point of 50° C. to 200° C.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
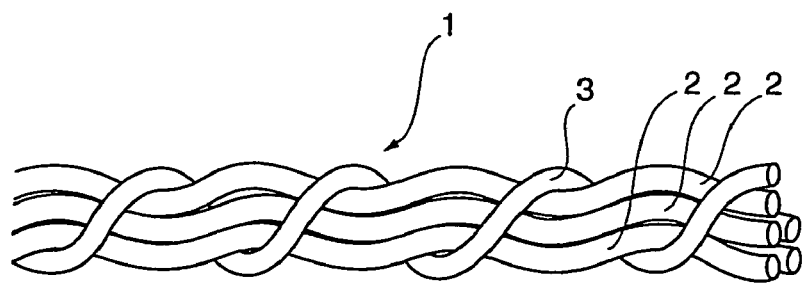
FIGS. 1 and 2 schematically illustrate metallic cords according to embodiments of the present invention.

Embodiments of the present invention are now described with reference to the drawings. FIG. 1 schematically illustrates a metallic cord 1 according to an embodiment of the present invention. The metallic cord 1 is formed by bundling a plurality of, e.g. two to 15, preferably two to 10 (five in FIG. 1) metallic wires such as steel wires 2, for example, in an unstranded state and shaping the bundle with a binder 3 of a polymer material. The steel wires 2 are wavily or spirally formed. While all wires 2 can be wavily or spirally formed at the same pitch, wavy or spiral steel wires having different shapes and different pitch phases can arbitrarily be combined with each other at need. In this case, a constant clearance is defined between the steel wires for further improving penetration of rubber and reinforcing adhesion between the rubber and the metallic cord 1 when the metallic cord 1 is embedded for a belt layer.

The steel wires 2 forming the metallic cord 1 can have substantially circular sectional shapes, i.e., circular, elliptic or flat oval shapes. When applied to the belt layer, the diameters of the steel wires 2 are preferably 0.15 to 0.40 mm. When the steel wires 2 have elliptic or flat oval sections, the average lengths and breadths are within the range of 0.15 to 0.40 mm. When set in the aforementioned range of the diameters, the steel wires 2 can supply proper rigidity to the belt layer and reduce rolling resistance as well as separation of an end portion of the belt layer. It is also possible to combine a plurality of types of steel wires having different diameters within the aforementioned range with each other.

When applied to a carcass, on the other hand, the diameters of the steel wires 2 are preferably 0.15 to 0.30 mm. When set in the aforementioned range of the diameters, the steel wires 2 can supply proper transverse rigidity to the carcass and maintain steering stability in high-speed driving.

After the plurality of steel wires 2 are bundled in an unstranded state, the metallic cord 1 is shaped with the binder 3 of the polymer material. The binder 3 of the polymer material can preferably be prepared from a thermoplastic resin having a melting point of 50° C. to 200° C. such as low-density polyethylene (melting point: 102 to 112° C.), medium-density polyethylene (melting point: 110 to 120° C.) or polypropylene (melting point: about 165° C.), for example. A molded tire is set in a curing mold under a temperature condition of 150° C. or 200° C. Therefore, the binder 3 of the polymer material shapes the steel wires 2 not to come apart from each other in the tire molding step. Under the curing condition, on the other hand, the binder 3 is melted to release the steel wires 2 from each other so that rubber readily penetrates into the clearance between the steel wires 2. The polymer material forming the binder 3 diffuses into the peripheral rubber in the curing step. If the melting point of the binder 3 exceeds 200° C., the binder 3 is not melted under the curing condition, and thus the rubber insufficiently penetrates into the metallic cord 1 and the required effects cannot be expected. If the melting point of the binder 3 of the polymer material is less than 50° C., the binder 3 readily flows with a slight temperature rise in a tire manufacturing step and thus cannot attain its shaping function. Therefore, the melting point of the binder 3 is preferably 100° C. to 200° C.

The binder 3 can be formed by working the aforementioned polymer material into the shape of a tape of 5 to 20 mm in width, a string or fiber or stranding a plurality of fibrous materials into a cord, or may have a variety of shapes.

The binder 3, shaping the plurality of steel wires 2 by spirally wrapping the plurality of bundled steel wires 2 in the longitudinal direction as shown in FIG. 1, may alternatively partially bind the steel wires 2 along the longitudinal direction.

Figure 2:
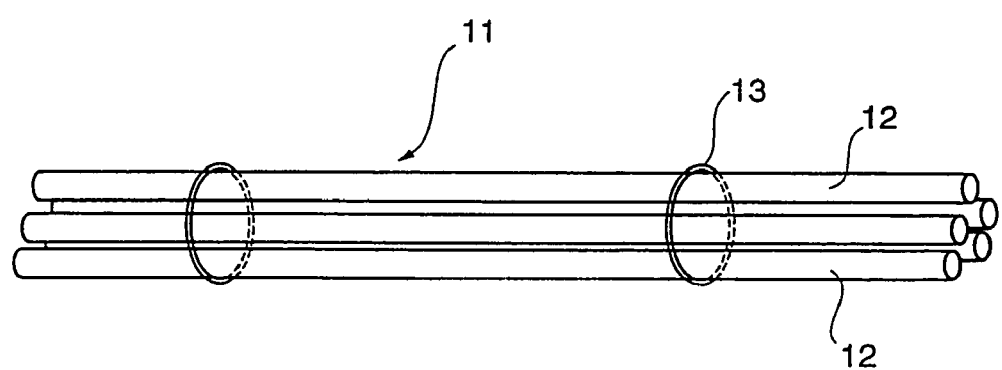

FIG. 2 shows a metallic cord 11 according to another embodiment of the present invention.

Referring to FIG. 2, the metallic cord 11 is formed by paralleling metallic wires such as five straight steel wires 12, for example, and bundling the same in an unstranded state. Binders 13 shape the steel wires 12 at prescribed intervals along the longitudinal direction.

The steel wires 12 have sectional shapes and diameters within the aforementioned ranges, while steel wires 12 having different diameters can be combined with each other or the straight steel wires 12 can be combined with spiral or wavy steel wires. In this case, penetration of rubber into the metallic cord 11 is further improved.

Thus the inventive metallic cord can be embedded in a belt layer for manufacturing a pneumatic tire.

Figure 3:
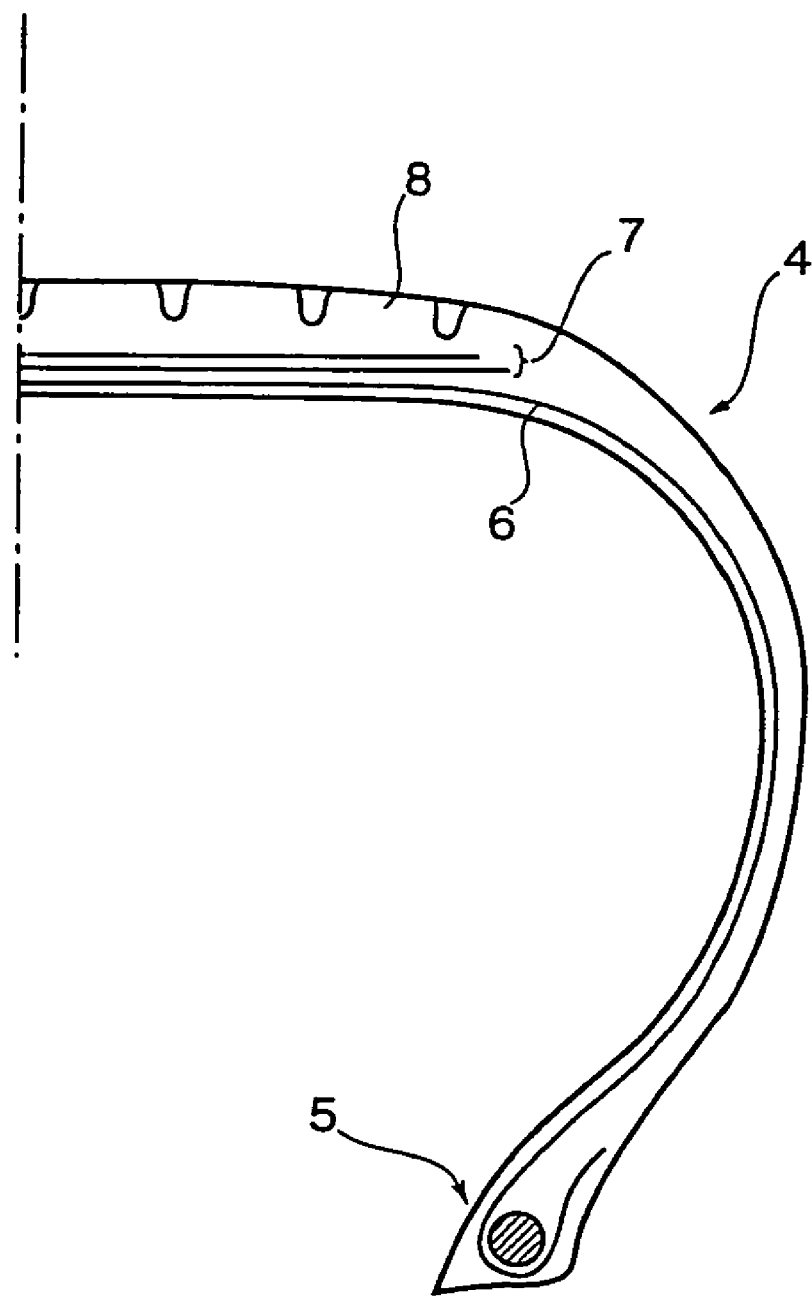
FIG. 3 is a sectional view showing the right half of a pneumatic tire for a passenger car according to the present invention.

FIG. 3 is a sectional view showing the right half of a pneumatic tire 4 according to the present invention. Referring to FIG. 3, the pneumatic tire 4 has a framework of a carcass 6 toroidally extending between a pair of bead portions 5, while a crown portion of the carcass 6 is reinforced by a belt layer 7 consisting of at least two plies and a tread portion 8 is arranged on the outer side of the belt layer 7 in the diameter direction of the tire 4. The aforementioned metallic cord forms at least one of the plies of the belt layer 7.

While the metallic cord is preferably formed by two to 15 metallic wires, two to six metallic wires are preferably applied to a belt layer of a radial tire for a passenger car in general. In order to attain prescribed rigidity of the belt layer with metallic cords each formed by a single metallic wire, the number of ends of the metallic cords must be increased in the ply. If the space between the metallic cords is too narrow that rubber readily separates from the ends of the metallic cords on both ends of the belt layer. This propagates between adjacent metallic cords to readily induce separation of the ply on both ends of the belt layer.

When the number of metallic wires forming each metallic cord exceeds 15, on the other hand, the rigidity of the belt layer is excessively increased to adversely affect the comfortableness of a passenger car employing a radial tire. When employing two to six metallic wires for each metallic cord of the aforementioned tire for a passenger car, the count of the metallic cords in the belt layer is 10 to 50, preferably 20 to 40 per width of 50 mm.

The metallic cord is embedded in rubber through a topping step for covering the metallic cord with rubber heated to 50° C. to 120° C. In this case, the aforementioned binder may be melted so that the rubber readily penetrates into clearances between the metallic wires forming the metallic cord. The ply of the belt layer obtained in this manner has no such problem that the metallic wires separate from each other in the later process steps.

In order to form the belt layer with plies, at least one of the plies is formed by the aforementioned metallic cord according to the present invention. When applied to a tire for a passenger car, such metallic cords are arranged to intersect with each other in opposite directions at an angle of 10 to 30° along the circumferential direction of the tire.

According to the present invention, metallic cords can be embedded in a carcass of a pneumatic radial tire for a truck or a bus.

Figure 4:
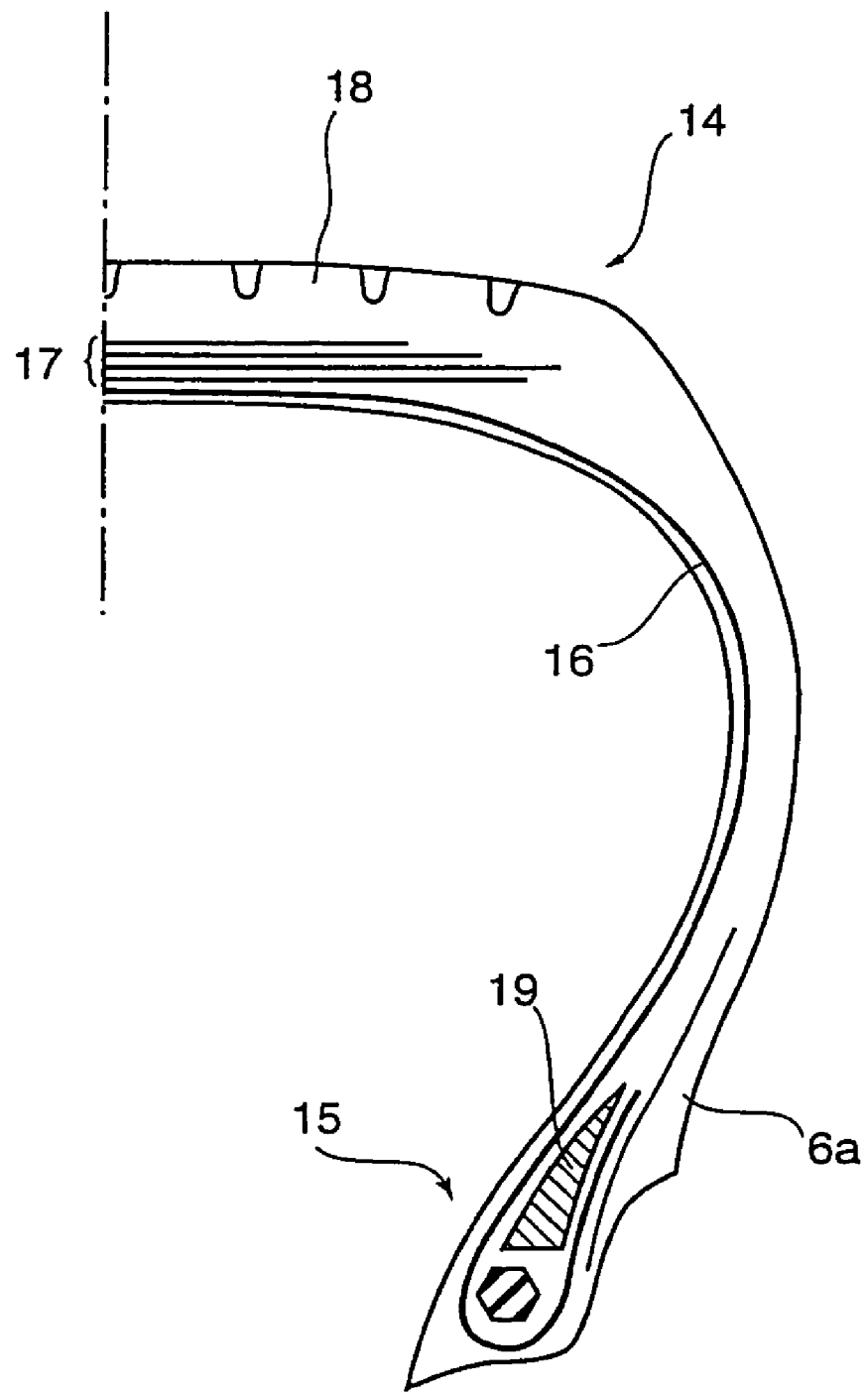
FIG. 4 is a sectional view showing the right half of a pneumatic tire for a truck or a bus according to the present invention.

FIG. 4 is a sectional view showing the right half of a pneumatic radial tire 14 for a truck or a bus according to the present invention. Referring to FIG. 4, the pneumatic radial tire 14 for a truck or a bus has a framework of a carcass 16 toroidally extending between a pair of bead portions 15 and a crown portion of the carcass 16 is reinforced with a belt layer 17 consisting of four plies, while a tread portion 18 is arranged on the outer side of the belt layer 17 in the direction of the diameter of the tire 14 and a bead apex 19 is arranged between the carcass 16 and its folded portion. The aforementioned metallic cords form the plies of the carcass 16.

While each metallic cord is preferably formed by two to 15 metallic wires, in general, five to 10 metallic wires are preferably applied to the pneumatic radial tire 14 for a truck or a bus [in general]. While the count of the metallic cords in the plies must be adjusted in order to supply prescribed rigidity to the carcass 16, the space between the metallic cords is narrowed if the number of wires forming each metallic cord is small to readily cause abrasion between the metallic cords or separation of rubber from the end 16a of the carcass 16. This propagates between adjacent metallic cords, to readily induce separation of the plies on the folded portion of the carcass 16.

When the number of the metallic wires exceeds 15, on the other hand, it is difficult for the rubber to penetrate into central portions of the cords. When forming each metallic cord with two to 10 metallic wires, the count of the metallic cords in the carcass 16 is 10 to 55, preferably 20 to 40 per width of 50 mm.

The metallic cord forming the carcass 16 is embedded in the rubber through the aforementioned topping step. In this step, the metallic cord is covered with the rubber heated to 50° C. to 120° C., similarly to the case of manufacturing the belt layer. In this case, the aforementioned binder is melted and the rubber readily penetrates into the clearances between the metallic wires forming the metallic cord. The plies of the carcass 16 obtained in this manner have no such problem that the metallic wires separate from each other in a later process step.

According to the present invention, the carcass 16 is formed by at least one ply having the embedded metallic cord arranged in a direction of 7° to 90° with respect to the circumferential direction of the tire. A reinforcing layer of a steel cord, an aramid fiber cord, a polyester fiber cord or a nylon fiber cord can be arranged on the inner or outer side of the carcass 16 for reinforcing the bead portion of the side wall portion of the tire.

The bead apex 19 arranged between the carcass 16 and its folded potion can be made of generally employed hard rubber, soft rubber or a combination of the hard rubber and the soft rubber. Further, a filler can be arranged in the vicinity of the upper end of the folded portion of the carcass 16 for reducing separation between the rubber and the metal.

In the pneumatic radial tire 14 for a truck or a bus, the belt layer 17 is formed by four plies. In a structure generally employed for such a radial tire for a truck or a bus, the plies are stacked at a cord angle in the range of 5 to 3° with respect to the circumferential direction of the tire 14. For example, the ply adjacent to the carcass 16 may be set to a cord angle of 40 to 70° while setting the cord angle of the remaining three plies at 5 to 30°. The belt layer 17, preferably formed by the metallic cord according to the present invention, may be formed by a generally employed steel cord or glass fiber, or a combination of an inorganic fiber cord and an aramid fiber cord, a nylon fiber cord or a polyester fiber cord.

EXAMPLES

Example 1

Various types of steel cords were prepared from steel wires for manufacturing belt plies of radial tires for passenger cars of 165/70SR13 in size and tires for trucks or buses of 11R22.5 in size by way of trial in the structure shown in FIG. 3 and FIG. 4 with specifications shown in Table 1. These tires were subjected to performance evaluation in the following methods. Table 1 also shows the results of the performance evaluation.

(1) Rubber Penetrance

A sample steel cord was taken out from each tire having a belt layer employing the steel cord in a state having topping rubber adhering thereto. After removing the rubber from the surface of the steel cord as much as possible, two adjacent wires were removed from five or six wires forming the steel cord by sectionally cutting the steel cord with a knife. The length of a portion of a clearance defined between the two removed wires and the bundle of the remaining wires and completely filled up with rubber was measured over about 10 cm for regarding the ratio of the length of the portion filled with rubber to the total length as penetrance of rubber. This measurement was performed on 10 samples, for regarding the average value as the measured value of the cord.

(2) Rolling Resistance

Rolling resistance of each steel cord was measured according to SAE J 1269 and displayed with an index number with reference to rolling resistance of the prior art 1 (100). The rolling resistance is reduced in proportion to the index number.

(3) Durability

Each tire was combined with a prescribed rim, filled with a prescribed internal pressure and mounted to a car for repetitively driving along a figure-eight course formed by combining two circles of 14 m in diameter with each other 500 times. Thereafter the tire was dismantled for counting the number of cut portions of a belt cord and displaying the durability with an index number with reference to the prior art 1 (100). A small index number indicates excellent durability with a small number of cut portions.

(4) Economy

Each steel cord formed by unstranded wires was regarded as excellent in economy since a stranding step was omittable while each steel cord formed by stranded wires was regarded as inferior in economy.

(5) Workability

Workability was regarded as excellent when the wires forming the steel cord did not come apart from each other during a tire molding step, while workability was regarded as inferior when the wires forming the steel cord came apart from each other.

It is understood from Table 1 that the inventive metallic cords are excellent in rubber penetrance and the tires employing the same are excellent in rolling resistance, durability, workability and economy in all Examples.

Example 2

Various types of steel cords were prepared from steel wires for manufacturing tires for trucks or buses of 11R22.5 in size by way of trial in the structure shown in FIG. 4 with binders in specifications shown in Table 2. In each tire, a cord angle of a carcass was 90° with respect to the circumferential direction. These tires were subjected to performance evaluation in the following methods. Table 2 also shows the results of the performance evaluation.

(1) Rusting Index Number after Driving

After driving by about 200,000 km, each tire was dismantled for observing a rusting situation of the metallic cord and displaying a rusting index number with reference to that of the prior art 2 (100). A small numeral value indicates small rusting.

(2) Strength Retention after Driving

After driving by about 200,000 km, each tire was dismantled and the metallic cord was taken out for displaying strength retention with an index number with reference to the strength before driving (100). A small numeral value indicates excellent strength retention.

Rubber penetrance, economy and workability were evaluated by methods similar to those employed in Example 1.

TABLE 1

| | Prior Art 1 | Example 1 | Example 2 | Example 3 | Example 4 | Comparative Example 1 | Comparative Example 2 | Comparative Example 3 |
|---|---|---|---|---|---|---|---|---|
| Metallic Cord | | | | | | | | |
| Structure of Steel Cord | 1 × 4 | 3 | 6 | 3 | 9 | 3 | 6 | 1 |
| Diameter of Steel Wire (mm) | 0.27 | 0.31 | 0.20 | 0.31 | 0.35 | 0.31 | 0.20 | 0.45 |
| Sectional Shape of Steel Wire | circular | elliptic | circular | circular | circular | circular | circular | circular |
| Forming of Wire | no | two-dimensionally waved | no | spiral | No | spiral | No | No |
| State of Steel Cord | stranded | bound by wrapping (FIG. 1) | bound (FIG. 2) | bound by wrapping (FIG. 1) | bound (FIG. 2) | bound by wrapping (FIG. 1) | No | No |
| Binder | — | string of low-density PE | string of low-density PE | string of low-density PE | string of low-density PE | steel filament | — | — |
| Belt Layer | | | | | | | | |
| Number of Plies | 2 | 2 | 2 | 2 | 4 | 2 | 2 | 2 |
| Count of Cords (number/50 mm) | 40 | 22 | 24 | 22 | 40 | 22 | 24 | 40 |
| Cord Angle (with respect to Circumferential Direction) | 20° × 20° | 20° × 20° | 20° × 20° | 20° × 20° | 20° × 20° × 20° × 20° | 20° × 20° | 20° × 20° | 20° × 20° |
| Tire Size | 165/70SR13 | 165/70SR13 | 165/70SR13 | 165/70SR13 | 11R22.5 | 165/70SR13 | 165/70SR13 | 165/70SR13 |
| Tire Performance | | | | | | | | |
| Rubber Penetrance(%) | 88 | 98 | 97 | 98 | 97 | 90 | 97 | 99 |
| Rolling Resistance | 100 | 98 | 97 | 98 | 98 | 98 | 97 | 97 |
| Durability | 100 | 102 | 101 | 102 | — | 101 | 100 | 108 |
| Workability | Excellent | Excellent | Excellent | Excellent | Excellent | Excellent | inferior | Excellent |
| Economy | inferior | Excellent | Excellent | Excellent | Excellent | Excellent | Excellent | excellent |

Note)
Low-density PE stands for low-density polyethylene.

TABLE 2

|  | Prior Art 2 | Example 5 | Example 6 | Example 7 | Comparative Example 4 | Comparative Example 5 |
|---|---|---|---|---|---|---|
| Carcass |  |  |  |  |  |  |
| Structure of Steel Cord | 3 + 8 + 13 | 9 | 6 | 9 | 9 | 6 |
| Sectional Shape of Steel Wire | circular | Circular | Circular | elliptic | Circular | Circular |
| Diameter of Steel Wire (mm) | 0.17 | 0.20 | 0.30 | 0.20 | 0.20 | 0.30 |
| Forming of Wire |  |  |  |  |  |  |
| Pitch Length (mm) | — | — | waveform 4.50 | spiral 5.0 | — | Waveform 4.50 |
| Pitch Height (mm) | — | — | 0.40 | 0.50 | — | 0.4 |
| State of Steel Cord | stranded | bound/ FIG. 2 | bound by wrapping/ FIG. 1 | bound by wrapping/ FIG. 1 | — | wire-wrapped |
| Binder note 1) | — | low-density PE (string) | low-density PE (string) | low-density PE (tape) | — | Wire |
| Count of Cords (number/50 mm) | 35 | 30 | 25 | 30 | 30 | 25 |
| Belt Layer |  |  |  |  |  |  |
| Number of Plies | 4 | 4 | 4 | 4 | 4 | 4 |
| Cord Angle (with respect to Circumferential Direction) | +20° · −20°, +20° and −20° from inner part of tire | | | | | |
| Count of Cords (number/50 mm) | 24 | 24 | 24 | 24 | 24 | 24 |
| Structure of Steel Cord | 2 + 7 | 2 + 7 | 2 + 7 | 2 + 7 | 2 + 7 | 2 + 7 |
| Diameter of Steel Wire (mm) | 0.22 | 0.22 | 0.22 | 0.22 | 0.22 | 0.22 |
| Performance |  |  |  |  |  |  |
| Rubber Penetrance (%) | 75 | 95 | 97 | 98 | 95 | 73 |
| Rusting Index Number of Cord | 100 | 45 | 38 | 35 | 45 | 72 |
| Strength Retention after Driving (index number) | 100 | 105 | 107 | 108 | 105 | 102 |
| Workability | ○ | ○ | ○ | ○ | X | ○ |
| Economy | X | ○ | ○ | ○ | ○ | ○ | note 1) Low-density PE stands for low-density polyethylene.

It is understood from Table 2 that Examples 5 to 7 according to the present invention are excellent in rubber penetrance as well as rusting index number and strength retention and workability and economy of tires.

Although the present invention has been described and illustrated in detail, it is clearly understood that the same is by way of illustration and example only and is not to be taken by way of limitation, the spirit and scope of the present invention being limited only by the terms of the appended claims.

According to the present invention, as hereinabove described, a plurality of metallic wires are bundled in an unstranded state and shaped with a binder meltable in a topping step or a curing step for forming a metallic cord and applying the metallic cord to a belt layer, whereby penetration of rubber in the metallic cord is improved for improving characteristics such as rolling resistance and durability of a tire.

What is claimed is:

1. A pneumatic tire having a framework of a carcass toroidally extending between a pair of bead portions with the crown portion of said carcass reinforced with a belt layer containing at least two plies, wherein at least one ply of said belt layer is formed by embedding in rubber a metallic cord obtained by shaping a bundle prepared by paralleling a plurality of metallic wires having substantially circular sections in an unstranded state with a binder of a polymeric material having a melting point of 50° C. to 200° C., whereby said binder melts during the curing of the molded tire to provide a clearance between the metallic wires for the penetration of the rubber into said clearance.

2. A pneumatic tire having a framework of a carcass toroidally extending between a pair of bead portions with the crown portion of said carcass reinforced with a belt layer containing a plurality of plies, wherein at least one ply of said carcass is formed by embedding in rubber a metallic cord obtained by shaping a bundle prepared by paralleling a plurality of metallic wires having substantially circular sections in an unstranded state with a binder of a polymeric material having a melting point of 50° C. to 200° C., whereby said binder melts during the curing of the molded tire to provide a clearance between the metallic wires for the penetration of the rubber into said clearance.

3. The pneumatic tire of claim 1, wherein the polymeric material is low-density polyethylene polypropylene, or medium-density polyethylene.

4. The pneumatic tire of claim 2, wherein the polymeric material is low-density polyethylene polypropylene, or medium-density polyethylene.

5. A The pneumatic tire of claim 1, wherein the binder circumscribes the metallic wires to form the metallic cord.

6. The pneumatic tire of claim 2, wherein the binder circumscribes the metallic wires to form the metallic cord.

7. The pneumatic tire according to claim 1, wherein said metallic wires are 0.15 to 0.3 mm in diameter.

8. The pneumatic tire of claim 1, wherein the wires have different shapes and different pitch phases.

9. The pneumatic tire of claim 1, wherein the wires have different circular, elliptic, or flat oval sectional shapes.

10. The pneumatic tire of claim 1, wherein the diameter of the metallic wires are 0.15 to 0.40 mm.

11. The pneumatic tire according to claim 1, wherein said binder is a cord, a tape or a string.

12. The pneumatic tire of claim 5, wherein the binder is in the shape of a tape having a width of 5 to 20 mm.

13. The pneumatic tire of claim 5, wherein the binder is spirally wrapped around the wires in the longitudinal direction.

14. The pneumatic tire according to claim 2, wherein said metallic wires are 0.15 to 0.3 mm in diameter.

15. The pneumatic tire of claim 2, wherein the wires have different shapes and different pitch phases.

16. The pneumatic tire of claim 2, wherein the wires have circular, elliptic, or flat oval sectional shapes.

17. The pneumatic tire of claim 2, wherein the diameter of the metallic wires are 0.15 to 0.40 mm.

18. The pneumatic tire according to claim 2, wherein said binder is a cord, a tape or a string.

19. The pneumatic tire of claim 6, wherein the binder is in the shape of a tape having a width of 5 to 20 mm.

20. The pneumatic tire of claim 16, wherein the binder is spirally wrapped around the wires in the longitudinal direction.

* * * * *